US011100238B2

(12) United States Patent
Giri

(10) Patent No.: US 11,100,238 B2
(45) Date of Patent: Aug. 24, 2021

(54) SYSTEMS AND METHODS FOR GENERATING POLICY COVERAGE INFORMATION FOR SECURITY-ENHANCED INFORMATION HANDLING SYSTEMS

(71) Applicant: Dell Products L.P., Round Rock, TX (US)

(72) Inventor: Prashanth Giri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 16/232,829

(22) Filed: Dec. 26, 2018

(65) Prior Publication Data
US 2020/0210598 A1 Jul. 2, 2020

(51) Int. Cl.
*G06Q 30/06* (2012.01)
*G06F 21/60* (2013.01)

(52) U.S. Cl.
CPC .................. *G06F 21/604* (2013.01)

(58) Field of Classification Search
None
See application file for complete search history.

(56) References Cited

U.S. PATENT DOCUMENTS

| 8,416,299 B2* | 4/2013 | Moore | G08B 13/19641 |
| | | | 348/152 |
| 8,843,129 B2* | 9/2014 | Li | H04W 36/0061 |
| | | | 455/434 |
| 2007/0180490 A1* | 8/2007 | Renzi | H04L 63/145 |
| | | | 726/1 |
| 2008/0022358 A1* | 1/2008 | Agarwal | G06F 21/6218 |
| | | | 726/1 |
| 2008/0066149 A1* | 3/2008 | Lim | G06F 21/6218 |
| | | | 726/1 |
| 2008/0120693 A1* | 5/2008 | Beilinson | G06F 21/604 |
| | | | 726/1 |
| 2008/0250493 A1* | 10/2008 | Bassani | G06F 21/604 |
| | | | 726/17 |
| 2010/0071024 A1* | 3/2010 | Eyada | H04L 63/1458 |
| | | | 726/1 |

(Continued)

*Primary Examiner* — Firmin Backer
(74) *Attorney, Agent, or Firm* — Jackson Walker L.L.P.

(57) ABSTRACT

An information handling system may include a host system comprising a processor and a management controller communicatively coupled to the processor, the management controller comprising firmware having a security module configured to enforce access control in accordance with a security policy. The security module may be further configured to, with respect to a process: (i) with respect to a firmware process, receive a plurality of access requests from the firmware process, wherein such plurality of access requests is generated as a result of at least one test case being applied to the firmware process; (ii) for each particular request of the plurality of requests, determine if the particular request is permitted in accordance with the security policy and if the particular request is permitted in accordance with the security policy, add an entry to a coverage store, the entry comprising information regarding the particular request; and (iii) compare the coverage store to the security policy to generate a policy coverage data file setting forth security rules of the security policy covered by execution of the plurality of requests.

21 Claims, 2 Drawing Sheets

(56) References Cited

U.S. PATENT DOCUMENTS

2016/0248809 A1\* 8/2016 Smith ................. H04L 63/0435
2018/0255102 A1\* 9/2018 Ward ...................... H04L 63/10
2020/0021501 A1\* 1/2020 Mugunda ................ H04L 41/22

\* cited by examiner

SYSTEMS AND METHODS FOR GENERATING POLICY COVERAGE INFORMATION FOR SECURITY-ENHANCED INFORMATION HANDLING SYSTEMS

TECHNICAL FIELD

The present disclosure relates in general to information handling systems, and more particularly to methods and systems for generating policy coverage information for security-enhanced information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a management controller, such as an Integrated Dell Remote Access Controller (iDRAC), to perform out-of-band remote management tasks on various components of the information handling system. As security of some information handling systems may be important, it may be desirable to provide security to a management controller by implementing management controller firmware for a management controller with a kernel having kernel security modules that provides a mechanism for supporting access control security policies, including mandatory access controls. An example of such kernel is Security-Enhanced Linux, also known as SELinux.

SELinux and other firmware with kernel security modules may define access and transition rights of every user, application, process, and file on an information handling system to prevent, for example, malicious software from obtaining control of important system resources. Kernel security modules may govern the interactions of these entities (users, applications, process, and files) using a set of access rules grouped together to form a security policy.

On a typical kernel security module-enabled information handling system, when a subject (e.g., an application), attempts to access an object (for example, a file), the kernel security module may forward the request to a security server, which looks up the security context of the application and the file in a matrix and computes the decision. Based on the computed decision, permission is then granted or denied. If the decision is to allow the access, the subject will be able to perform requested operation on the object, otherwise the operation is rejected and a denial may be logged in an appropriate log file. All such access decisions may be cached for future references.

Owing to the complexity of modern management controller firmware, it typically requires significant time and expense to write policies to cover all of the management controller and firmware components on a management controller firmware image. Policy writing may be an involved task where the aim is to provide only the necessary permissions to permit applications to perform their desired functionality, and only their desired functionality. Allowing permissions beyond that necessary may present a security risk and could leave holes in the policy for an application. An application or process under an attack could be commanded to perform actions (because the security policy allows it) which it does not even need to carry out in first place. Accordingly, it is critical to keep track of processes' functionality and capability footprints (which all resources the process accesses at runtime) and accordingly revoke un-required access permissions in security policies. Traditional approaches do not provide a mechanism to determine required policy rules of a security policy versus unrequired (extraneous) policy rules for an entity.

As an illustration, there are many ways in which a process may have extraneous access permissions. For example, a security policy writer may erroneously may use bulk permission macros (e.g., full access) instead of fine-grained individual permissions (e.g., read access only). As another example, as application code evolves over time, its functionality may change. If the policy rules associated with the application are not modified accordingly, the application may end up with more than the required set of access permissions. As a further example, security risks may arise when a policy rule set is reused across different platforms.

SUMMARY

In accordance with the teachings of the present disclosure, the disadvantages and problems associated with existing approaches for ensuring security in security-enhanced information handling systems may be reduced or eliminated.

In accordance with embodiments of the present disclosure, an information handling system may include a host system comprising a host system processor and a management controller communicatively coupled to the host system processor, the management controller comprising firmware having a security module configured to enforce access control in accordance with a security policy. The security module may further configured to, with respect to a process, with respect to a firmware process, receive a plurality of access requests from the firmware process, wherein such plurality of access requests is generated as a result of at least one test case being applied to the firmware process, and for each particular request of the plurality of requests determine if the particular request is permitted in accordance with the security policy and if the particular request is permitted in accordance with the security policy, add an entry to a coverage store, the entry comprising information regarding the particular request. The security module is also configured to compare the coverage store to the security policy to generate a policy coverage data file setting forth security rules of the security policy covered by execution of the plurality of requests.

In accordance with embodiments of the present disclosure, a method may be provided for use in an information handling system comprising a host system comprising a host system processor and a management controller communicatively coupled to the host system processor, the management controller comprising firmware having a security module configured to enforce access control in accordance with a security policy. The method may include, with respect to a process, with respect to a firmware process, receiving a plurality of access requests from the firmware process, wherein such plurality of access requests is generated as a result of at least one test case being applied to the firmware process. The method may also include for each particular request of the plurality of requests, determining if the particular request is permitted in accordance with the security policy and if the particular request is permitted in accordance with the security policy, adding an entry to a coverage store, the entry comprising information regarding the particular request. The method may further include comparing the coverage store to the security policy to generate a policy coverage data file setting forth security rules of the security policy covered by execution of the plurality of requests.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host system comprising a host system processor and a management controller communicatively coupled to the host system processor, the management controller comprising firmware having a security module configured to enforce access control in accordance with a security policy: (i) with respect to a firmware process, receive a plurality of access requests from the firmware process, wherein such plurality of access requests is generated as a result of at least one test case being applied to the firmware process; (ii) for each particular request of the plurality of requests, determine if the particular request is permitted in accordance with the security policy; and, if the particular request is permitted in accordance with the security policy, add an entry to a coverage store, the entry comprising information regarding the particular request; and (iii) compare the coverage store to the security policy to generate a policy coverage data file setting forth security rules of the security policy covered by execution of the plurality of requests.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
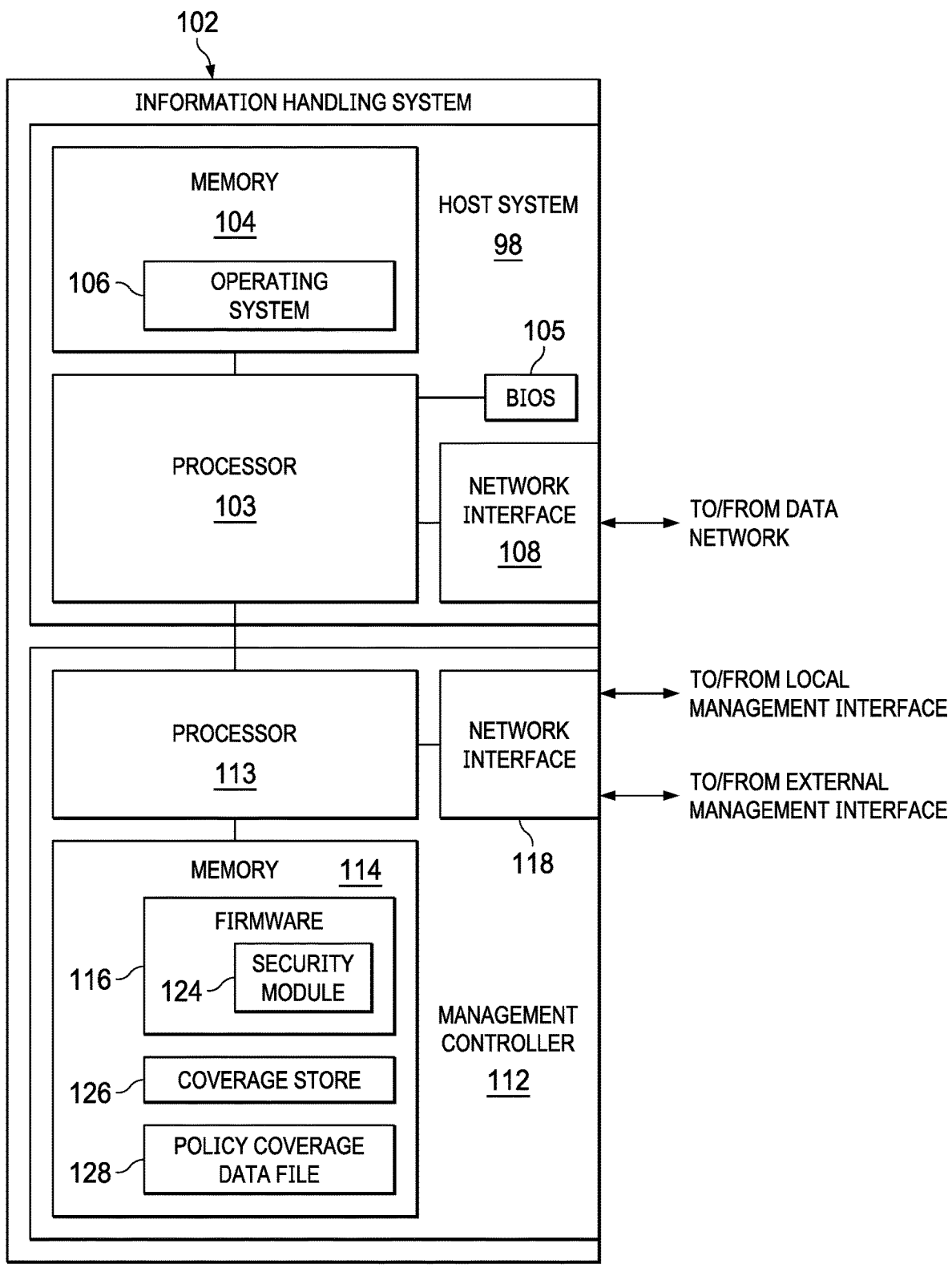
FIG. 1 illustrates a block diagram of an example information handling system, in accordance with embodiments of the present disclosure.
Figure 2:
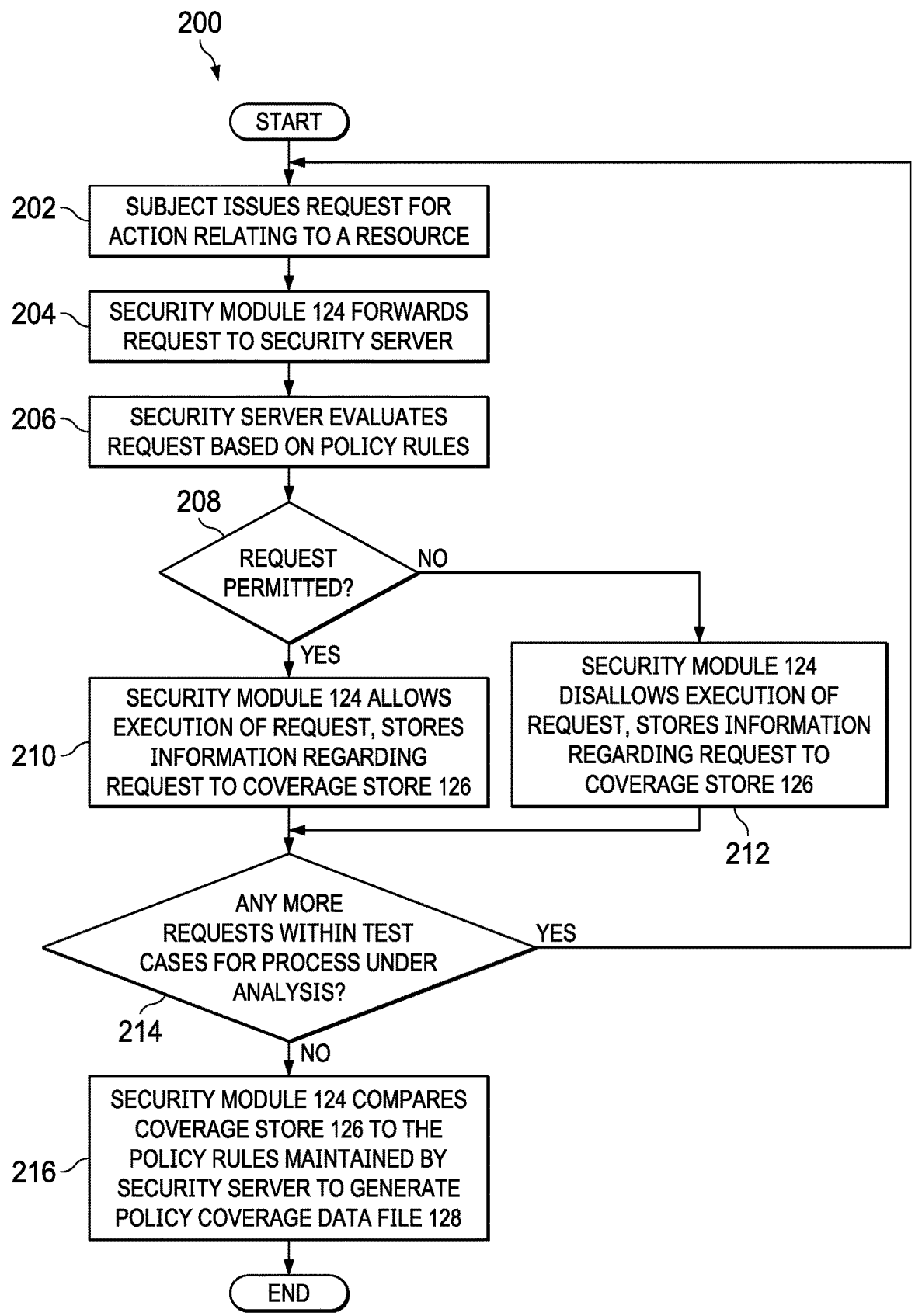
FIG. 2 illustrates a flow chart of an example method for generating policy coverage information for a security-enhanced information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103. In operation, processor 103, memory 104, BIOS 105, and network interface 108 may comprise at least a portion of a host system 98 of information handling system 102. For purposes of clarity and exposition, information handling system 102 has been depicted to comprise only a single host system 98. In some embodiments, information handling system 102 may comprise a plurality of host systems 98.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. In these and other embodiments, processor 103 and network interface 108 may be coupled via any suitable interface, including without limitation a Peripheral Component Interconnect Express (PCIe) bus/interface.

Management controller 112 may be configured to provide management facilities for management of information handling system 102. Such management may be made by management controller 112 even if information handling system 102 is powered off or powered to a standby state. Management controller 112 may include a processor 113, memory 114, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), Peripheral Component Interconnect Express (PCIe) bus, and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. As shown in FIG. 1, memory 114 may have stored thereon firmware 116, coverage store 126, and policy coverage data file 128.

Firmware 116 may comprise any program of executable instructions, or aggregation of programs of executable instructions, configured to perform the functionality of management controller 112, including managing and/or controlling the allocation and usage of resources of management controller 112. In addition, firmware 116 may include all or a portion of a network stack for network communication via a network interface (e.g., network interface 118 for communication over a management network). Active portions of firmware 116 may be executed by processor 113. In some embodiments, firmware 116 may be implemented with an operating system, such as Linux, for example.

As shown in FIG. 1, firmware 116 may comprise a security module 124. Security module 124 may comprise any program of executable instructions, or aggregation of programs of executable instructions, configured to support and enforce access control security policies relating to firmware 116 and management controller 112. Security module 124 may comprise a kernel security module that define access and transition rights of every entity (e.g., user, application, process, and file) associated with management controller 112 and firmware 116. Security module 124 may governs the interactions of such entities using a set of access rules grouped together to form a security policy. As an example, when a subject (e.g., an application), attempts to access an object (for example, a file), the security module 124 may forward the request to a security server (e.g., executing within the same kernel as security module 124), and such security server may perform a look up of the security context of the application and the file in a security matrix and compute a decision with respect to the request. Based on the computed decision, security module 124 may grant or deny permission of the subject's attempted access to the object. If the decision is to allow the access, security module 124 may permit the subject to perform the requested operation on the object, otherwise security module 124 may reject the requested operation. In some embodiments, security module 124 may be implemented using Security-Enhanced Linux.

Further, security module 124 (or another component of firmware 116) may be configured to determine a minimal policy required for a process to fully perform its tasks with respect to management controller 112. In operation, security module 124 may, with respect to a firmware process, receive a plurality of access requests from the firmware process, wherein such plurality of access requests is generated as a result of at least one test case being applied to the firmware process. These access requests may be monitored by security module 124 which may forward the requests to the security server for a security decision (e.g., allow/disallow). Security module 124 may monitor execution of the access requests, and store in coverage store 126 coverage information for the process, such coverage information indicating which policy rules applicable to the process were actually invoked during execution of the test cases. Further, security module 124 may compare the coverage information in coverage store 126 to the policy rules for the process, to generate a policy coverage data file 128 setting forth those policy rules which are covered (i.e., invoked) by actual execution of the process. In some embodiments, policy coverage data file 128 may also set forth a separate indication of those policy rules which are uncovered (i.e., not invoked) by actual execution of the process. Accordingly, the policy rules for the process may be rewritten to exclude the policy rules which are uncovered by actual execution of the process. Functionality of security module 124, coverage store 126, and policy coverage data file 128 is set forth in more detail with respect to the discussion of method 200, below.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

In addition to processor 103, memory 104, BIOS 105, network interface 108, and management controller 112, information handling system 102 may include one or more other information handling resources.

FIG. 2 illustrates a flow chart of an example method 200 for generating policy coverage information for security-enhanced information handling system 102, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

Using method 200, security module 124 may cause execution of access requests, wherein such access requests are generated as a result of at least one test case being applied to the firmware process, each request relating to a subject (e.g., an application, user, etc.) issuing a request for an action (e.g., create, open, get attribute, set attribute, read, write, execute, append, rename, link, unlink, input/output control (ioctl), lock, search, add name, remove name, etc.) relating to a resource (e.g., file, hardware component, second process, etc.).

At step 202, a subject (e.g., a process, application, etc.) may issue a request for an action (e.g., create, open, get attribute, set attribute, read, write, append, rename, link, unlink, input/output control (ioctl), lock, search, add name, remove name, etc.) relating to a resource (e.g., file, hardware component, second process, etc.). In response, at step 204, security module 124 may forward the request to a security server (e.g., internal to the kernel in which security module 124 executes). At step 206, the security server may evaluate the request based on policy rules accessible to the security server (e.g., stored within a policy database). At step 208, security module 124 may receive a response from the security server and determine if the request is permitted or denied. If denied, method 200 may proceed to step 212. If permitted, method 200 may proceed to step 210.

At step 210, responsive to permission of the request, security module 124 may allow execution of the request, and may store information regarding the request to coverage store 126. After completion of step 210, method 200 may proceed to step 214.

At step 212, responsive to denial of the request, security module 124 may disallow execution of the request.

At step 214, security module 124 may determine if more access requests exist within the process under analysis. If more requests exist, method 200 may proceed again to step 202, and steps 202-212 may be repeated, as applicable, to all other requests associated with the test cases for the process under analysis. If no more requests exist, method 200 may proceed to step 216.

Once step 216 is reached, coverage store 126 may comprise a collection of entries, each entry associated with a request that was allowed to execute in accordance with the security policy maintained by the security server. Thus, at step 216, security module 124 may compare coverage store 126 to the policy rules maintained by the security server and, based on such comparison, generate policy coverage data file 128, setting forth policy rules that were covered (i.e., invoked) with respect to execution of the test cases for the process. In some embodiments, security module 124 may also separately identify within policy coverage data file 128 those policy rules that were uncovered (i.e., not invoked) with respect to execution of the test cases for the process. Thus, based on information set forth in policy coverage data file 128, a policy writer may rewrite the policy rules to reduce permissions of the security policy to those rules that were covered with respect to execution of the test cases for the process, thus potentially decreasing access points for malicious processes. After step 216, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using bootable update firmware 116, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system comprising a host system processor and a host system network interface to couple the host system processor to a data network; and
   a management controller comprising a management processor communicatively coupled to the host system processor and communicatively coupled to a management network interface to couple the management controller to at least one interface selected from an external management interface and a local management interface, the management controller comprising firmware having a security module configured to enforce access control in accordance with a security policy, and further configured to:
   with respect to a firmware process, receive a plurality of access requests from the firmware process, wherein such plurality of access requests is generated as a result of at least one test case being applied to the firmware process;
   for each particular request of the plurality of requests:
   determine if the particular request is permitted in accordance with the security policy; and
   if the particular request is permitted in accordance with the security policy, add an entry to a coverage store, the entry comprising information regarding the particular request; and
   compare the coverage store to the security policy to generate a policy coverage data file setting forth security rules of the security policy covered by execution of the plurality of requests and separately setting forth security rules that were not invoked by execution of the plurality of requests.

2. The information handling system of claim 1, wherein the firmware is further configured to generate the policy coverage data file to identify security rules of the security policy uncovered by execution of the plurality of requests.

3. The information handling system of claim 1, wherein each request of the plurality of requests comprises a subject issuing a request for an action relating to a resource.

4. The information handling system of claim 3, wherein the subject comprises one of an application and a user.

5. The information handling system of claim 3, wherein the action comprises one of, with respect to the resource, a request to create, open, get attribute, set attribute, read, write, append, rename, link, unlink, perform input/output control, lock, search, add name, and remove name.

6. The information handling system of claim 3, wherein the resource comprises one of a file, a hardware component, and a second process.

7. The information handling system of claim 1, wherein the determining if the particular request is permitted in accordance with the security policy comprises communicating the request to a policy server executing within the kernel of the security module.

8. A method comprising, in an information handling system comprising a host system comprising a host system processor and a management controller communicatively coupled to the host system processor, the management controller comprising a management processor communicatively coupled to a management network interface to couple the management controller to at least one interface selected from an external management interface and a local management interface and firmware having a security module configured to enforce access control in accordance with a security policy:
  with respect to a firmware process, receiving a plurality of access requests from the firmware process, wherein such plurality of access requests is generated as a result of at least one test case being applied to the firmware process;
  for each particular request of the plurality of requests:
  determining if the particular request is permitted in accordance with the security policy; and
  if the particular request is permitted in accordance with the security policy, adding an entry to a coverage store, the entry comprising information regarding the particular request; and
  comparing the coverage store to the security policy to generate a policy coverage data file setting forth security rules of the security policy covered by execution of the plurality of requests and separately setting forth security rules that were not invoked by execution of the plurality of requests.

9. The method of claim 8, wherein the firmware is further configured to generate the policy coverage data file to identify security rules of the security policy uncovered by execution of the plurality of requests.

10. The method of claim 8, wherein each request of the plurality of requests comprises a subject issuing a request for an action relating to a resource.

11. The method of claim 10, wherein the subject comprises one of an application and a user.

12. The method of claim 10, wherein the action comprises one of, with respect to the resource, a request to create, open, get attribute, set attribute, read, write, append, rename, link, unlink, perform input/output control, lock, search, add name, and remove name.

13. The method of claim 10, wherein the resource comprises one of a file, a hardware component, and a second process.

14. The method of claim 8, wherein the determining if the particular request is permitted in accordance with the security policy comprises communicating the request to a policy server executing within the kernel of the security module.

15. An article of manufacture comprising:
a non-transitory computer-readable medium; and
computer-executable instructions carried on the computer-readable medium, the instructions readable by a processor, the instructions, when read and executed, for causing the processor to, in an information handling system comprising a host system comprising a host system processor and a management controller communicatively coupled to the host system processor, the management controller comprising a management processor communicatively coupled to a management network interface to couple the management controller to at least one interface selected from an external management interface and a local management interface and firmware having a security module configured to enforce access control in accordance with a security policy:
  with respect to a firmware process, receive a plurality of access requests from the firmware process, wherein such plurality of access requests is generated as a result of at least one test case being applied to the firmware process;
  for each particular request of the plurality of requests:
  determine if the particular request is permitted in accordance with the security policy; and
  if the particular request is permitted in accordance with the security policy, add an entry to a coverage store, the entry comprising information regarding the particular request; and
  compare the coverage store to the security policy to generate a policy coverage data file setting forth security rules of the security policy covered by execution of the plurality of requests and separately setting forth security rules that were not invoked by execution of the plurality of requests.

16. The article of claim 15, wherein the firmware is further configured to generate the policy coverage data file to identify security rules of the security policy uncovered by execution of the plurality of requests.

17. The article of claim 15, wherein each request of the plurality of requests comprises a subject issuing a request for an action relating to a resource.

18. The article of claim 17, wherein the subject comprises one of an application and a user.

19. The article of claim 17, wherein the action comprises one of, with respect to the resource, a request to create, open, get attribute, set attribute, read, write, append, rename, link, unlink, perform input/output control, lock, search, add name, and remove name.

20. The article of claim 17, wherein the resource comprises one of a file, a hardware component, and a second process.

21. The article of claim 15, wherein the determining if the particular request is permitted in accordance with the security policy comprises communicating the request to a policy server executing within the kernel of the security module.

* * * * *